United States Patent [19]

Held

[11] 4,449,986
[45] May 22, 1984

[54] MACHINE FOR GUIDING NUMERICALLY CONTROLLED SUPPORTS FOR TOOLS USED IN WOODWORKING OPERATION

[76] Inventor: Kurt Held, Alte Strasse 1,, D-7218 Trossingen 2, Fed. Rep. of Germany

[21] Appl. No.: 263,566

[22] Filed: May 14, 1981

[30] Foreign Application Priority Data

May 16, 1980 [DE] Fed. Rep. of Germany ....... 3018760
Dec. 12, 1980 [DE] Fed. Rep. of Germany ....... 3046766

[51] Int. Cl.³ ............................................. B23B 39/00
[52] U.S. Cl. .................................. 29/26 A; 144/2 R; 198/341; 409/155
[58] Field of Search ...................... 144/2 R; 29/26 A; 198/341; 409/151, 155, 167, 173, 189, 191, 192; 408/3, 12, 13, 88

[56] References Cited

U.S. PATENT DOCUMENTS 3,730,634  5/1973  Gerber et al. ............................ 408/3
4,243,081  1/1981  Pritelli ................................... 144/356

Primary Examiner—W. D. Bray
Attorney, Agent, or Firm—Toren, McGeady and Stanger

[57] ABSTRACT

A machine for guiding numerically controlled supports for tools used for various woodworking operations, such as boring, milling and the like, for improving the relationship between the time for positioning the workpiece and for processing the workpiece includes a base on which frame supports mount guidance supports. Tool support guides are mounted on the guidance supports for movement in two directions extending perpendicularly of one another. Conveying members including retaining members extend along the guidance supports for moving workpieces through the machine. Tool support guides are located on the guidance supports for displacement in the two different directions of movement. Upper and lower tool supports are positioned on the tool support guides along with gripping members. Using this combination of components, the speed of movement of the workpiece can be synchronized with the processing time for the workpiece. Further, using one edge of the workpiece as a reference line the coordination of movement and processing can be effected.

3 Claims, 2 Drawing Figures

MACHINE FOR GUIDING NUMERICALLY CONTROLLED SUPPORTS FOR TOOLS USED IN WOODWORKING OPERATION

SUMMARY OF THE INVENTION

The present invention is directed to a machine including a guidance device for numerically controlled tool carriers for processing large area workpieces, in particular, for various woodworking operations, such as boring, milling and the like, of furniture workpieces for improving the relationship between the processing time and the positioning time of the workpieces.

In the processing of furniture components formed of wood or woodlike materials, the movement of the components into and out of the processing position usually requires a higher proportion of the total time for effecting the combined transporting and processing operation. If numerically controlled tool carriers are used for producing freely programmable bore patterns, the workpiece transport time is an even greater problem because, inherent to the system, the limited number of processing tools and the positioning of the tools extends the time required to produce a single workpiece as compared with using multi-spindle boring machines. Accordingly, the time for transporting or positioning the workpiece is extremely costly.

Therefore, the primary object of the present invention is to provide a machine arrangement in which freely programmable, numerically controlled processing machines carry out the processing operations so that a significant improvement is achieved in the relationship between the processing time and the positioning time. Such a machine assembly affords a considerable improvement in productivity.

In accordance with the present invention, the machine structure includes a base, such as a base plate extending in two generally perpendicular directions with frame supports extending transversely and outwardly from the base plate and guidance supports positioned on the frame supports. Conveyor chains or belts are located on the guidance supports for transporting and positioning the workpieces to be processed. The speed with which the workpieces are moved through the working space of the machine is adjusted according to the time, dependent on processing, required for the workpiece to be located in the working space and it is determined during parts programming. The leading or trailing edge of the workpiece, as it moves through the working space in the machine, is checked photooptically so that the edge acts as a reference line for the various operations to be performed. Directional controls of the machine are operated by determining the location of the reference edge. The reference edge is used as the reference for the various coordinates determining the location at which a processing operation is to be performed. As the conveyor means moves the workpiece through the working space of the machine the movement of the conveyor means indicates the displacement of the reference edge during the setting of a command value relative to a corresponding machine axis.

The conveyor means in the form of chains or belts serve to position the workpiece in the machine working space. The tool support guides along with their tool supports can be equipped with upwardly directed tools for processing the underside of the workpiece and with downwardly directed tools for processing the upper surface of the workpiece. To provide simultaneous working of the workpiece from above and below, the conveyor means are equipped with narrow retaining boards.

It has been found that the use of the conveyor means as gripping or holding devices are unsuited for processing long workpieces, accordingly, the upper tool support can be provided with one or more downwardly directed gripping members and each of the guidance supports at the opposite end of the machine in the feed direction is provided with a stationary gripping member.

The advantage of this machine is found in the higher processing capacity without any detriment to the precision of the processing operation. It is unnecessary to decelerate, immobilize and position the workpiece during processing and, further, it does not need to be accelerated during transport. The displacement of the reference edge of the workpiece in the feeding direction can be carried out reliably without inertia by digital means. Further, a modular arrangement can be used with a number of base members or plates set next to one another to increase the production capacity or enlarge the work space of the overall machine.

The various features of novelty which characterize the invention are pointed out with particularity in the claims annexted to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
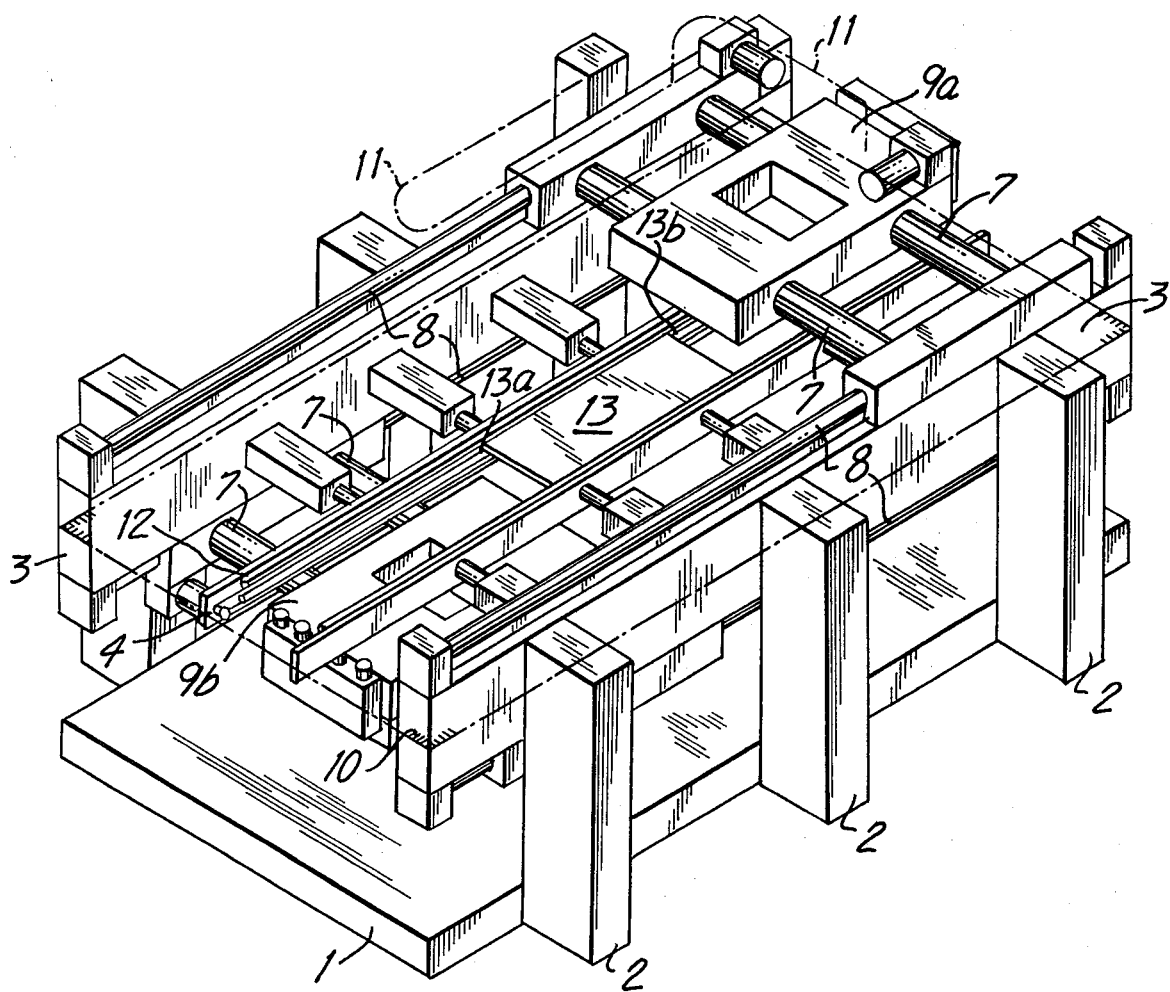
FIG. 1 is a schematic perspective view illustrating the structure of the machine for moving workpieces into the working space.

In FIG. 1 the base of the machine embodying the present invention is provided by a rectangularly shaped base plate 1 having a long direction representing the feed direction through the working space on the machine and a transverse direction representing the width direction of the working space. For the purposes of this description, the movement in the long direction over the base plate 1 is considered the first direction or X-axis, movement in the transverse direction, that is in the width direction of the base plate 1 is the second direction or the Y-axis and the direction perpendicular to the X-axis and Y-axis is considered the Z-axis. Frame supports 2 spaced apart in the X-axis direction along each side of the base plate, extend vertically upwardly from the base plate that is in the Z axis direction. Guidance supports 3 are positiontined on the frame supports above the base plate 1 with the guidance supports extending in the first direction or the direction of the X-axis. The area between the frame supports 2 forms a working space. On the inside faces of the guidance supports 3 facing into the working space within the machine are conveying chains 4 for carrying a workpiece 13 through the working space so that it can be processed, that is, undergo various wood working operations. The workpiece 13, such as a flat planar number, has a leading end 13a and a trailing end 13b and one of these ends or edges provides a reference edge for carrying out the various control operations to be performed during transporting and processing or carrying out woodworking steps on the workpiece. The leading and trailing ends or edges extend in the Y-axis direction.

First and second tool support guides 8, 7 are mounted on the guidance supports 3 and in turn mount the tool supports 9a, 9b which can be moved over the workpiece within the working space of the machine. First tool support guides 8 extend in the first direction or in the direction of the X-axis while the second tool support guides 7 extend transversely of the first direction, in the second direction or in the direction of the Y-axis. Accordingly, the tool supports can be moved over the workpiece in both the X-axis and Y-axis direction into the desired position. Retaining boards 12 are located on the guidance supports 3 immediately above the conveyor chains 4 and permit the simultaneous processing of the workpiece 13 from above and below. The workpiece 13 is held between the retaining boards 13 and the conveyor claim 3. The plane of symmetry 10 of the guide device is shown extending in the first and second directions and the power supply 11 is indicated schematically.

Figure 2:
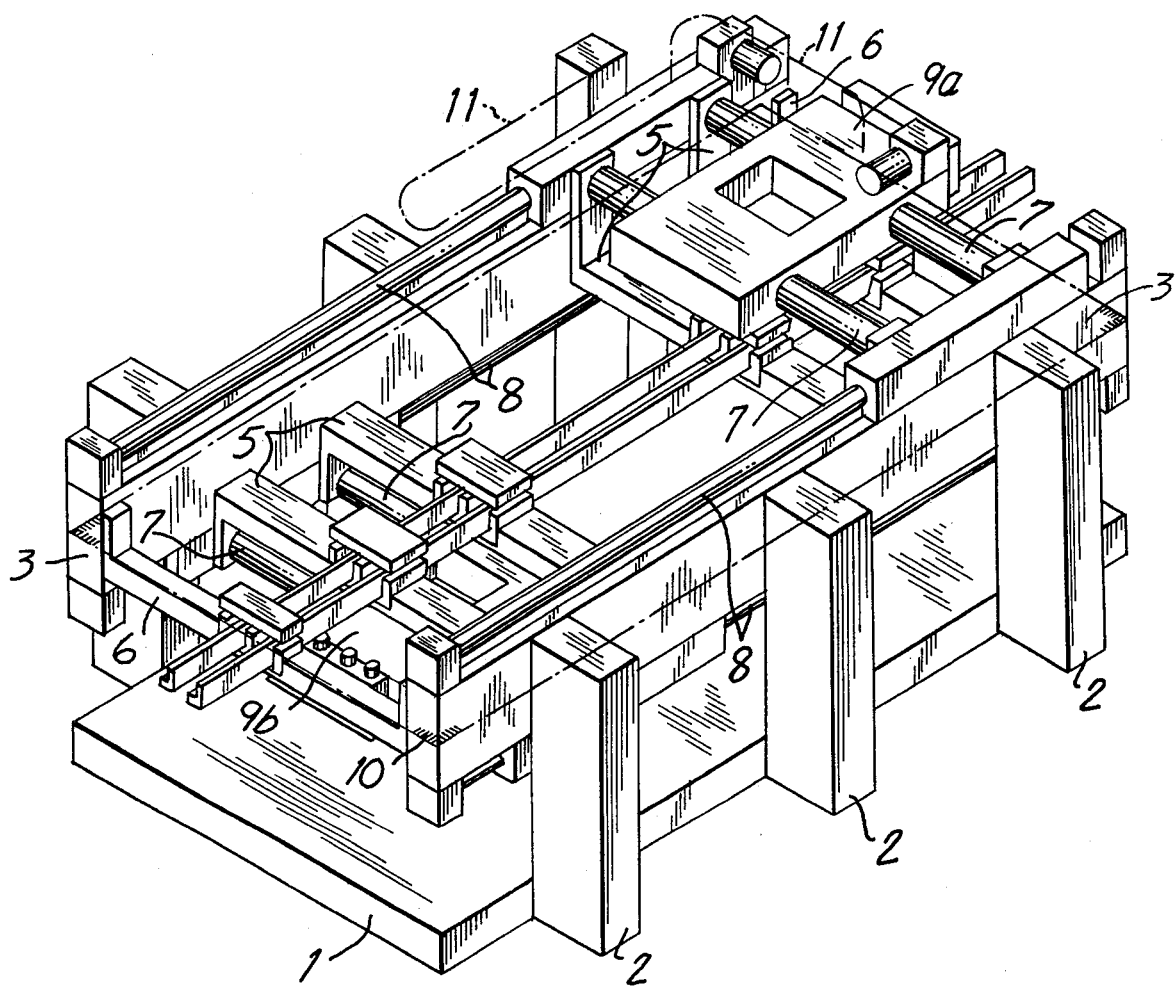
FIG. 2 is a schematic perspective view similar to FIG. 1, however, displaying the processing equipment for working on long workpieces.

In FIG. 2 the machine is formed of the same structure including the base plate 1, the frame supports 2 and the guidance supports 3. Above and below the plane of symmetry 10 there are the first tool support guides 8 for guiding the tool supports in the first or X-axis direction. Extending transversely between the guidance supports 3 are the second tool support guides 7 for effecting movement of the tool supports in the second or Y-axis direction. The tool supports 9a, 9b are mounted on the first and second tool support guides 7, 8 so that they can be selectively positioned over predetermined coordinates for effecting a desired working operation to be performed by the tool mounted on the tool supports. The tool supports 9a, 9b each have gripping devices 5 mounted on them which are movable along with the tool supports. At the opposite ends of the guide supports 3 stationary gripping devices 6 are provided. As in FIG. 1, in FIG. 2 the plane of symmetry 10 for the guidance device is shown and the power supply 11 is indicated schematically.

The conveying means 4 along with the gripping devices 5 and 6 afford an advantageous handling of long-strip shape workpieces with the stationary gripping devices 6 or the movable gripping devices 5 holding the workpiece in a desired position relative to the woodworking tools to be used in a particular operation. With the stationary gripping devices 6 open, the conveying means can transport a workpiece through the working space to a desired location until it is secured by the stationary gripping device at the exit end of the working space or is held by the movable gripping devices on the upper tool support.

During the movement of a workpiece through the working space on the machine, an electronic measurement device, such as a photo-optical device is used for determining the precise location of the workpiece. Such a device is known, accordingly it is not illustrated in the drawing. If the gripping devices 5, 6 are controlled so that during operation, relative to the first or X-axis direction, at least one stationary gripping device 6 holds the workpiece fast relative to the machine structure, it thus secures the reference edge of the workpiece so that it can be located by the electronic measurement device. With the stationary gripping device holding the workpiece, before there is any further movement of the workpiece, a movable gripping device grips the workpiece before the stationary gripping device is opened or released, accordingly, the workpiece is held in position with the reference edge being secured with respect to the known measurement device so that the control of the machine can be carried out effectively.

By properly locating the workpiece, it is possible for the woodworking tools, mounted on the tool supports, to move in the direction of the Y-axis or the Z-axis even while the workpiece is being conveyed by means of the lower tool support 9b. The movement of the workpiece can be taken over by the upper tool support 9a and transported in a similar manner and processed during the transportation step. Otherwise, it can be held securely in position by one or both of the stationary gripping devices 6 and processed on one or both of the tool supports 9a, 9b with the woodworking operation being carried out in any one of the X-axis, Y-axis or Z-axis directions as desired, and with the gripping devices on the tool supports being opened.

When continuous strip-shaped workpieces, driven either in a cyclical manner or in a continuous manner by a separate drive, are moved through the working spaces in the machine, then the tool supports can be synchronized with the moving workpiece by activating the movable gripping devices in the processing position, as long as the processing or woodworking operations are carried out in the Y-axis or Z-axis directions. Alternatively, as required, a strip can be gripped and supported by the gripping device on one tool support and its further movement in the X-axis direction measured while the other tool support carries out a processing step in the X-axis, Y-axis or Z-axis direction.

By providing a modular character for the various components of the machine, that is, the base plate 1, the frame supports 2, the guidance support 3, the first and second tool support guides 8, 7 and the upper and lower tool supports 9a, 9b, the working space through the machine can be varied within wide limits to provide an arrangement with two or more tool supports. It would also be possible to carry out the woodworking operations in two separate processing planes using separate tool supports.

While specific embodiments of the invention have been shown and described in detail to illustrate the application of the inventive principles, it will be understood that the invention may be embodied otherwise without departing from such principles.

I claim:

1. Machine for guiding numerically controlled supports for tools used for various woodworking operations such as boring, milling and the like, comprising a base plate having two pairs of opposite sides with one pair of sides extending in a first direction and the other pair of sides extending in a second direction substantially perpendicular to the first direction, frame supports connected to and extending upwardly from said base plate transversely of the first and second directions, guidance supports mounted on said frame supports and extending in the first direction transversely of the upward direction of said frame supports, means located on said guidance supports for conveying at least one workpiece to be processed, said means comprising conveyor members extending in the first direction, an upper tool support located above said conveyor members and a lower tool support located below said conveyor members, means for movably supporting said upper and lower tool supports from said guidance supports so that said first and second tool supports can be moved relative to the workpiece in the first and second directions, at least one first gripping member on said upper tool support and at least one second gripping member on said lower tool support, said first and second gripping members being movable with said upper and lower tool supports, a third stationary gripping member at each of the opposite ends of said guidance supports spaced apart in the first direction whereby using said first, second and third gripping members the speed of movement of the workpiece being processed can be synchronized with the processing time for the workpiece and an edge of the workpiece extending transversely of the first direction can be utilized as a reference edge such as by photo-optically checking the location of the edge for effecting the location of the processing operations of the workpiece, and for operating said gripping members in accordance with the processing operations being performed.

2. Machine, as set forth in claim 1, wherein said means for movably supporting said upper and lower tool supports comprises first tool support guides mounted on said guidance supports and extending in the first direction, second tool support guides mounted on said guidance supports and extending in the second direction so that said upper and lower tool supports can be moved in the first and second directions of said base plate.

3. Machine, as set forth in claims 1 or 2, including retaining means positioned on said guidance supports above said conveyor members for holding workpiece on said conveyor members for simultaneously processing the workpieces from above and below.

* * * * *